(12) United States Patent
Rebuli et al.

(10) Patent No.: US 9,199,319 B2
(45) Date of Patent: Dec. 1, 2015

(54) CLAMPING DEVICE FOR A MACHINE FOR DUPLICATING KEYS

(75) Inventors: David Rebuli, Trebaseleghe (IT); Enrico Tome', Conegliano (IT)

(73) Assignee: KEYLINE S.P.A., Conegliano (IT)

( * ) Notice: Subject to any disclaimer, the term of this patent is extended or adjusted under 35 U.S.C. 154(b) by 0 days.

(21) Appl. No.: 14/115,470

(22) PCT Filed: May 16, 2012

(86) PCT No.: PCT/EP2012/059166
§ 371 (c)(1),
(2), (4) Date: Nov. 4, 2013

(87) PCT Pub. No.: WO2012/159965
PCT Pub. Date: Nov. 29, 2012

(65) Prior Publication Data
US 2014/0079501 A1    Mar. 20, 2014

(30) Foreign Application Priority Data
May 24, 2011 (IT) .............................. PN2011A0039

(51) Int. Cl.
*B23C 3/35* (2006.01)
*B25B 1/10* (2006.01)
*B25B 1/24* (2006.01)

(52) U.S. Cl.
CPC . *B23C 3/355* (2013.01); *B23C 3/35* (2013.01); *B25B 1/103* (2013.01); *B25B 1/2473* (2013.01); *B23C 2270/12* (2013.01); *Y10T 409/309016* (2015.01)

(58) Field of Classification Search
CPC ............. B23C 3/35; B23C 3/355; G01B 5/20
USPC ......... 269/303, 315, 105, 134, 137, 138, 156, 269/172, 242, 187, 118, 287, 107, 171; 409/81, 232
See application file for complete search history.

(56) References Cited

U.S. PATENT DOCUMENTS 1,730,510 A * 10/1929 Jensen ............................ 269/42
2,552,094 A *  5/1951 Hamon et al. ................. 269/156
4,054,281 A    10/1977 Martinsson
(Continued)

FOREIGN PATENT DOCUMENTS

| FR | 2003326 A1 | 12/2004 |
|---|---|---|
| IT | PN20 040 066 A1 | 12/2004 |
| JP | 3056603 U | 2/1999 |

*Primary Examiner* — Lee D Wilson
*Assistant Examiner* — Jamal Daniel
(74) *Attorney, Agent, or Firm* — Birch, Stewart, Kolasch & Birch, LLP (57) ABSTRACT

Clamping device for a machine duplicating keys, with a body lodging two jaws apt to transversely tighten a key, wherein the two jaws can be approached and/or spaced by the activation of only one operation component, and a bridge is arranged apt to tighten the key against the body through a movement (Y) orthogonal to the reciprocal motion (X) of the jaws; these jaws are provided with respective inclined planes with a symmetrical inclination, and the bridge is provided with two inclined planes each having the same inclination of a respective of the inclined planes of the two jaws. Elastic components are arranged which are capable of pushing the bridge against the two jaws along a direction (Y) orthogonal to the direction (Y) of reciprocal tightening of the two jaws, and the bridge is provided in its outer portion with a relief capable of tightening the key against the body.

20 Claims, 5 Drawing Sheets

(56) References Cited

U.S. PATENT DOCUMENTS

| | | | |
|---|---|---|---|
| 4,188,163 A | 2/1980 | Juskevic | |
| 5,676,504 A | 10/1997 | Mueller et al. | |
| 5,906,365 A * | 5/1999 | Wu | 269/43 |
| 6,641,339 B2 * | 11/2003 | Chies et al. | 409/81 |
| 7,077,607 B2 | 7/2006 | Foscan | |
| 7,153,072 B2 * | 12/2006 | Wu | 409/81 |
| 7,163,364 B2 * | 1/2007 | Foscan et al. | 409/81 |
| 2002/0182022 A1 | 12/2002 | Chies et al. | |
| 2006/0062644 A1 | 3/2006 | Foscan et al. | |
| 2007/0224008 A1 | 9/2007 | Bass et al. | |
| 2013/0017030 A1 * | 1/2013 | Freeman et al. | 409/81 |
| 2013/0294857 A1 * | 11/2013 | Bass et al. | 409/82 |
| 2013/0309033 A1 * | 11/2013 | Sieveking | 409/81 |

* cited by examiner

CLAMPING DEVICE FOR A MACHINE FOR DUPLICATING KEYS

The present invention relates to an automatic clamping device able to be used for a machine duplicating keys.

Essentially, and for further clearness, the present invention consists in an implementation of the invention relative to a clamp for duplicating keys registered as patent (application) No. PN2004A000066 of the same patentee, which has to be referred to, for the sake of brevity.

In said patent it is disclosed a clamp comprising a body apt to lodge a key to be detected, or to be cut wherein the key to be worked is blocked firmly and with a predetermined position and orientation.

In order to block the key in that position, it is necessary to carry out the following operation:

a) to insert the key inside the gauged opening 19 so as to prevent the key overturning movement, b) after inserting the key in the chosen position, it is necessary to block it in said position acting on jaw 6 blocking it against the fixed jaw 5.

At this stage the key is ready to be worked.

Anyway, it is well known to the skilled in the art that, in the case wherein it is desired to change the type of key, which usually occurs, and to use a key with a different thickness, it is necessary to replace the whole clamping device since each clamping device is provided with a gauged opening, which is specific for each single key thickness, and only for that; therefore if it is desired to mount a key of different thickness, according to the current technique, it is essential to remove the complete clamping device and to mount a new one, specific for the new thickness.

It is apparent then, that working in succession different keys having different thicknesses forces to continually adjust the clamp used, removing it and mounting it again any time the kind/thickness of the key changes; it is apparent that this operation becomes onerous in a highly competitive operating and productive context, and because of that it has to make any effort in order to minimize the time of work stoppage which the time needed to adjust the clamp according to the thickness of the key can be compared to.

A lot of means and methods have been disclosed for the blocking of a key in a machine for duplicating keys; and with regard to this, it is to mention patent U.S. Pat. No. 7,077,607 of the same patentee, patent US 2007/0224008 and patent U.S. Pat. No. 5,676,504. Anyway, in none of these patents it has been dealt with, and let alone solved the problem of positioning in a safe and predetermined way a key to be worked/copied, in an automatic simple way and independently from its thickness.

It would therefore be desirable, and it is the main object of the present invention, to provide a type of clamping device in order to fix in a predetermined position, with respect to three axes in the space, a key to be worked, so that the blocking of such key can occur through only one operation; moreover said clamping device has to be compact and has to be formed in a simple way by means of known materials and techniques which are easily and economically available.

Such an object is achieved by a clamping device for duplicating keys formed according to the appended claims.

Characteristics and advantages of the invention will be apparent from the following description for exemplification only but not limited to, with reference to the appended drawings, wherein.

with the clamping device without the key, with the clamping device whereon a key has been inserted, but not yet blocked, with the clamping device with the key tightened only on two opposed sides, with the clamping device with the key tightened on all four opposed sides.

In the following part of the description terms such as "above", "below", "up", "down" "lower" are likely to be used; the skilled in the art will not have any difficulties in understanding that such terms relate to the orientation of the clamping device in its typical working structure, clearly shown by the appended figures and therefore these terms, far from causing misunderstandings, will, on the contrary, explain and define the content of the invention more clearly and more simply.

With reference to the figures, a clamping device for a machine duplicating keys, comprises:

a body 1 wherein two jaws 2, 3 are lodged able to firmly clasp between each other in the transverse sense according to an axis "X" a key 4 to be decoded or a key to be coded; in fact it is a typical practice that a clamping device of a type similar to the one described in said patent No. PN2004A000066 is used both to block an original key and to sense its profile and, after sensing said profile, to block a "blank" key so as to be able to easily and exactly code it according to said profile.

Anyway such method is known per se, and lies outside the objects of the present patent.

Clamping device 1 is described as referred to three Cartesian axes "X", "Y" and "Z" wherein axis "X" is an axis indicating the approaching and spacing direction of said two jaws 2 and 3, and hence obviously a first blocking direction of the key as well; axis "Y" indicates the second direction of the key blocking, orthogonal to the first, and according to which other blocking means, which will be better described later, move; obviously axis "Z" is orthogonal to the first two due to construction, and in the figures it represents the longitudinal axis of a conventional key and of the universally known type.

Figure 2:
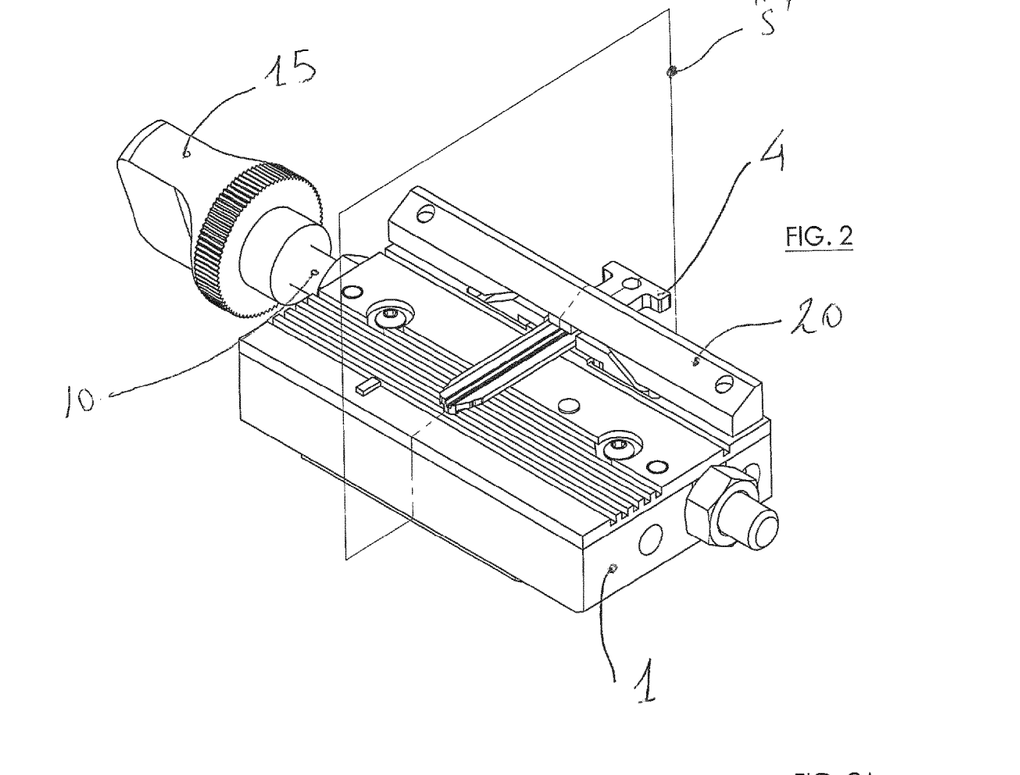
FIG. 2 shows a view of the clamping device of FIG. 1, from a different observation point, FIG. 2A show a view of the clamping device in FIG. 1A, from a different observation point, FIGS. from 3 to 6 show respective front plan sections according to viewing plane A-A of the clamping device in FIG. 1, in different operating phases, and that is.

For simplicity in the figures it is shown that the key is blocked according axis "X" against the narrow edges 4A of the gripped portion and is blocked according to axis "Y" against the two opposed large sides 4B, which are gripped, tightened and rotated by the operator when using the key itself (FIG. 2).

Said two jaws can be approached and/or spaced by the activation of only one operation means, and basically they operate as "slides" which always move in the same right direction, both when approaching and when being spaced, sliding inside suitable seats or guides in body 1.

Figure 1:
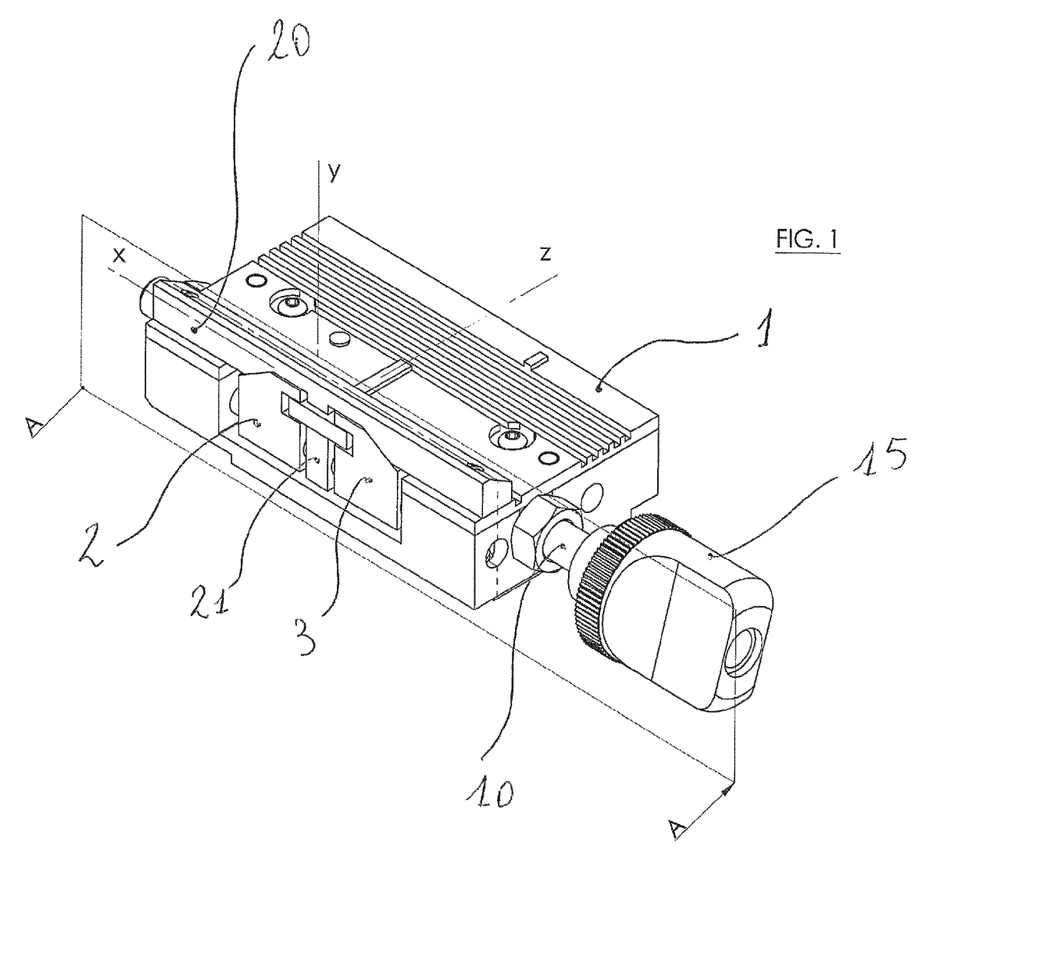
FIG. 1 shows an external perspective view of a clamping device according to the invention still without a key.

Moreover, said two jaws movable with respect to said body 1, preferably move symmetrically with respect to the plane passing through axes "X" and "Z", as symbolically shown in FIGS. 1 and 2.

Figure 7:
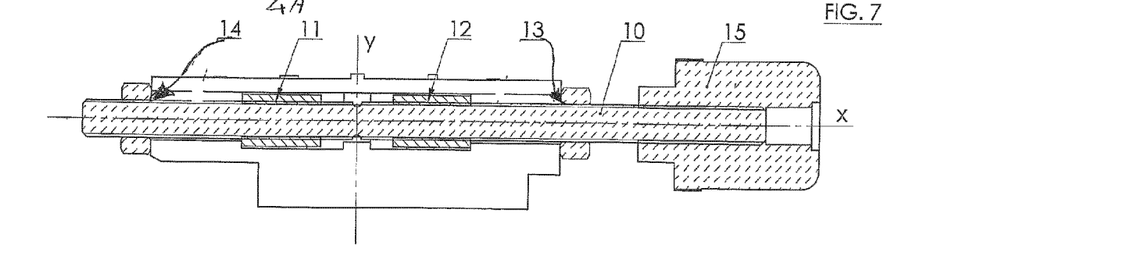
FIG. 7 shows a view similar to the one in FIG. 5, but wherein there are highlighted the reciprocal screw/thread engagement means between two means which have to transmit each other a motion transforming it from a rotating motion into a translation motion.

Said operation means is preferably formed by a rotating shaft 10, basically aligned along said first axis X and which can be engaged, through screw/thread engagement means symbolically identified as 11 and 12 (FIG. 7) with both respective said jaws.

Moreover, said rotating shaft 10 is hinged on suitable holes 13, 14 (FIG. 4) arranged in said body 1, and it is blocked in its axial movement with respect to said holes 13, 14, but of course being able to rotate inside these; in substance said rotating shaft rotates with respect to body 1, but it is axially retained by said body.

Essentially then, the rotation of said shaft 10, helped by a suitable knob 15, and due to said screw/thread engagement means 11, 12, makes the two jaws move contemporaneously in their reciprocal approaching or spacing.

On one side of said two jaws, oriented in the same direction, it is arranged a bridge element 20 apt to tighten said key against a portion 21 of said body 1 through a translation motion having direction parallel to said second axis (Y) orthogonal to said first axis (X); said portion 21 is of course in the opposite part with respect to key 4; in particular, in the conventional use, said key is first placed exactly on said portion 21, and then is tightened in the way it is herewith explained.

In the general solution and in principle, said bridge 20 can be engaged, at least partially, to said two jaws and it is actuated by their approaching movement to the key and consequent tightening, meaning that the movement of said jaws, due to their approaching or spacing, makes said bridge 20 approach said portion 21, and vice versa, and hence said key is tightened between said two means.

The preferred form of embodiment, and shown in the figures, is based on the fact that:

said two jaws are provided with respective inclined planes 2A, 3A each of them being oriented with a symmetrical inclination 2aa, 2bb with respect to a central symmetry plane "S" passing through said second axis Y and orthogonal to said first axis X (FIG. 2), and that said bridge 20 is provided with two inclined planes 20A, 20B (FIG. 6) each having the same inclination 2aa, 2bb of a respective of said inclined planes 2A, 2B (FIG. 5), being also oriented towards a respective jaw which is below said inclined plane, and finally being able of getting into contact through a sliding engagement with a respective of the inclined planes 2A, 3A of said two jaws.

In order to keep said bridge 20 into position with respect to the rest of body 1 and of the relative jaws, elastic means are arranged which are able of pushing said bridge against said two jaws along a direction parallel to said second axis "Y".

Figure 8:
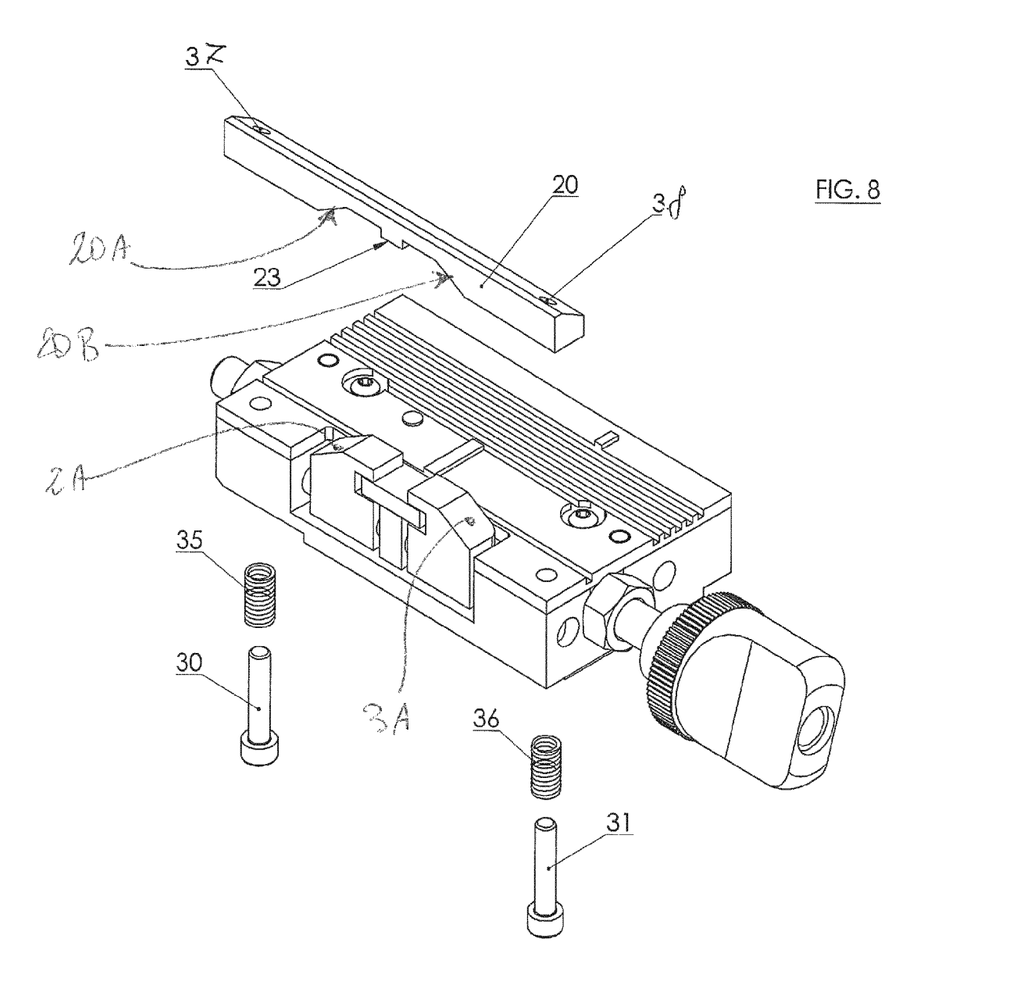
FIG. 8 shows an exploded view of the clamping device in FIG. 1.

Advantageously said elastic means comprise (FIG. 8) rigidly bound elements, such as two bolts 30, 31 screwed into 32, 33 (FIG. 6) against the ends of said bridge element 20 and on the two opposed sides of said key 4, and spring elements 35, 36 respectively interposed and acting between said bolts 30, 31 and respective portions or lodgings 37, 38 of said body (FIG. 8).

Figure 3:
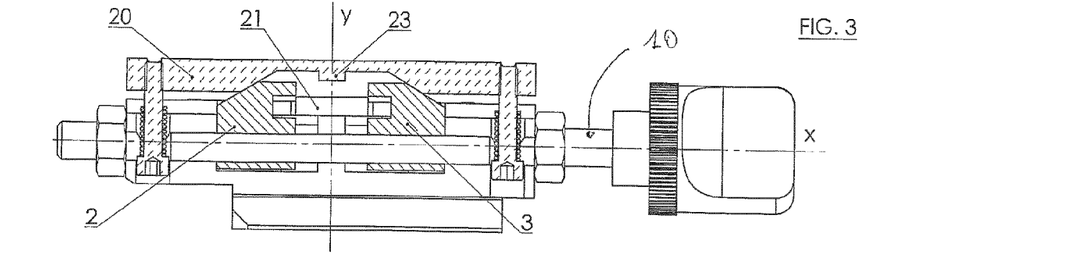

The reciprocal dimensions and the general structure of the described involved elements have to be such that the rotating actuation of shaft 10 causes the two jaws 2, 3 to approach, and hence making the relative inclined planes 2A and 3A approach (FIG. 3); such approaching reduces the width of the space they taken up which makes it possible that the reduced space is soon taken up by the inclined planes 20A and 20B of bridge 20 due to the action of the elastic means all of them referred to with the reference numbers from 30 to 38; of course this allows the lowering of said bridge towards position 21 where key 4 is placed.

Figure 4:
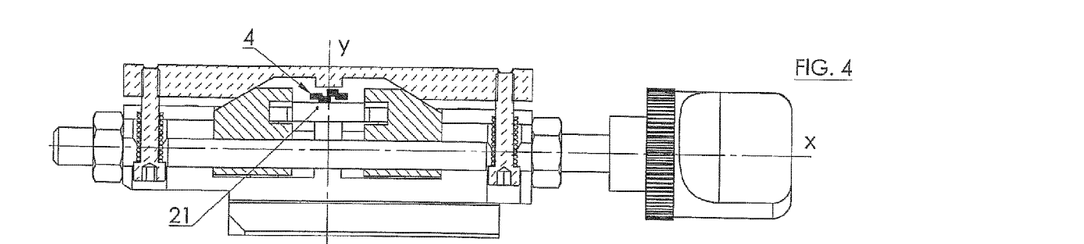
Figure 5:
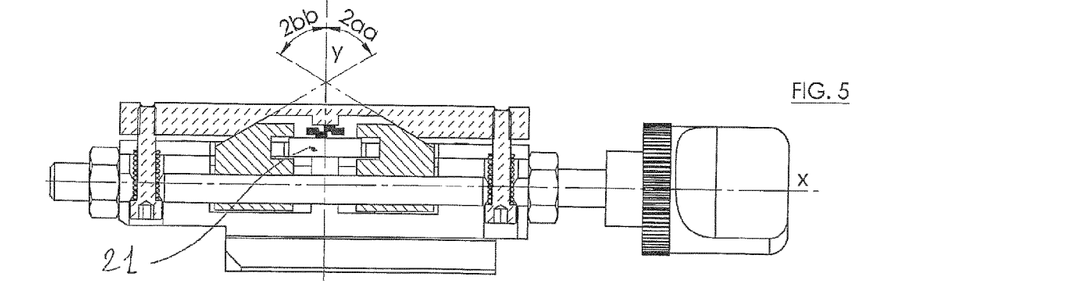
Figure 6:
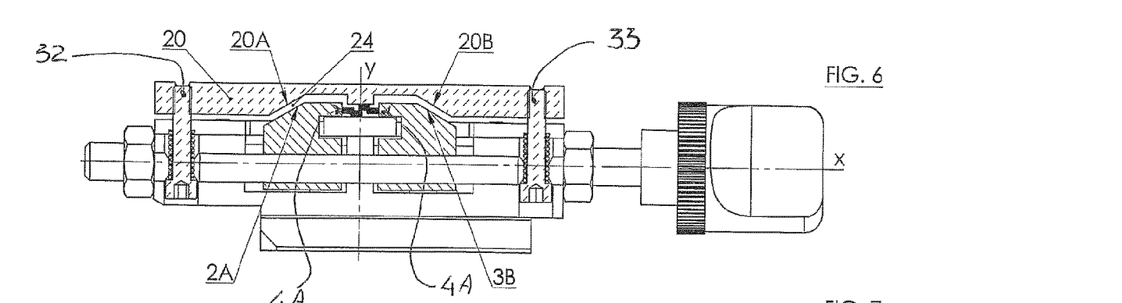

At this stage a first explanation of how the invention works can be given: in fact, first, the bridge has to be raised (FIG. 3), and this is possible acting on shaft 10, which makes the two jaws 2, 3 space each other and hence, due to the pressure caused by interference between the two pairs of the inclined planes, causes bridge 20 to raise;

then key 4 is placed on said portion 21, that is, between this one and said bridge 20 (FIG. 4);

then, through the rotation of shaft 10, and because of the type of engagement and of the geometry of the inclined planes both of the jaws and of bridge 20, this one is lowered so as to tighten the key against said portion 21 (FIG. 5);

and finally the carrying on of their approaching brings the two jaws 2, 3, into contact with sides 4A of the key, until they tighten against these sides (FIG. 6).

And the key is definitively blocked, in the direction "X", by said two opposed jaws 2, 3, against sides 4A, and in the direction "Y", between bridge 20 (from above) and portion 21 of body 1 (from below), against the large sides 4B.

The just described invention enables the following advantageous implementations:

1) in fact, it might occur the case wherein the lower surface of bridge 20 in its movement towards jaws 2 and 3 might get into interference against the upper facing surfaces of said jaws, and hence be unable to tighten against the upper face of the key; in order to prevent such an inconvenience, said bridge 20 is provided in its outer portion oriented to said two jaws of a relief 23 able of tightening said key against the upper portion 21 of body 1.

Of course such relief has to be sufficiently deep, but also limited in width so as to be able to abut and push on the key below, without interfering with the movement of the two jaws which have to end their approaching and lateral tightening movement on the sides 4A of the key, as clearly shown in FIG. 6.

Figure 1A:
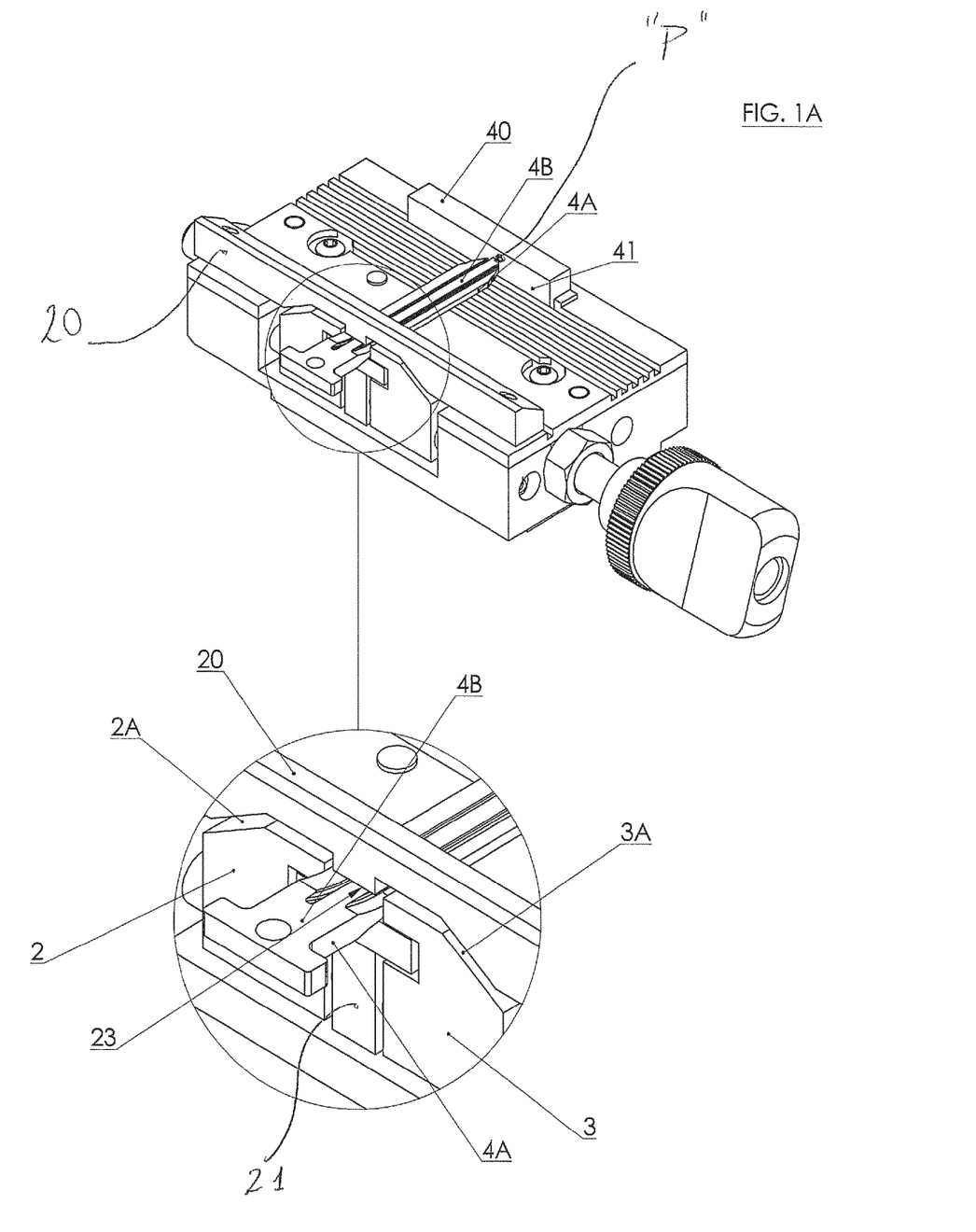
FIG. 1A shows an external perspective view of a clamping device according to the invention, wherein a key is inserted and tightened.
Figure 2A:
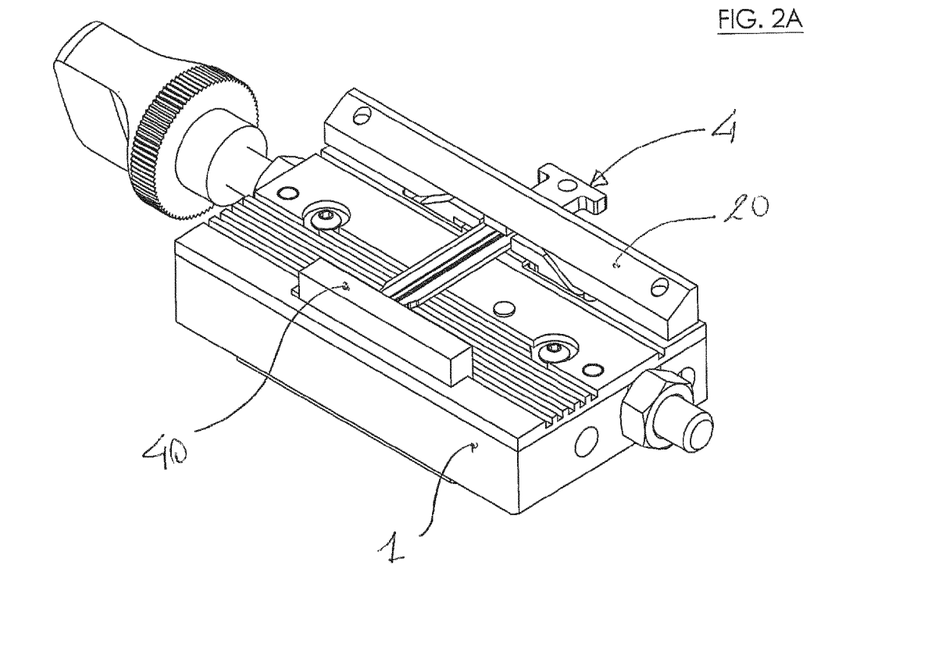

2) The second implementation is a direct consequence of the foregoing one; in fact, the dimensions and structure of the involved devices have to enable that, after blocking key 4 between the bridge 20, and preferably between said relief 23 and the portion 21 below, the two jaws 2 and 3 have to further approach until coming into contact, and therefore laterally tighten said key; because of that, as the lowering movement of the bridge 20 after the contact of relief 23 against the key is stopped by this one and kept in this position by the above described elastic means, and as, on the contrary, said jaws continue their approaching, an inter space 24 is formed between bridge 20 and said two jaws which is a direct consequence of the described construction;

3) The third implementation consists in the following: with reference to FIGS. 1A and 2A, on the surface of body 1 whereon the key is placed, it is provided a front stopper 40 integral to body 1 itself; such front stopper 40 is dimensioned and positioned so that the distance of its surface 41 from a reference element of the clamping device, e. g. from the bridge 20, is of a predetermined and known distance.

This front stopper is needed to limit the key movement when this is inserted in the clamping device, so as to certainly determine its position with respect to axis "Z" (FIG. 1).

Hence, inserting the key in a clamping device formed as such, and tightening the clamping device itself on the key through said bridge 20 (and relief 23) with respect to axis "Y", and through said jaws 2 and 3 with respect to axis "X"; in order to automatically and definitely position the key itself with respect to said three axes "X", "Y", "Z" (FIG. 1A) it will be sufficient to simply insert the key to be worked between bridge 20 and said portion 21, pushing it until its end "P" touches and stops against surface 41 of the front stopper 40.

In conclusion the clamping device according to the invention achieves the desired purposes such as: the key positioning in the three axes with respect to the clamping device, automatic achievement of said positioning through only one operation means (that is the rotation of shaft 10), automatic checking of the key position along an axis of the key, and absolute construction and working simplicity;

4) the fourth implementation, the last in this list but in the practice really significant, consists in making said clamping device in a completely symmetrical way with respect to said plane "S".

Even though the figures show that such clamping device is basically symmetrical with respect to said plane "S", in principle it is not to be taken for granted that it should necessarily be so.

In fact, it has to be reminded that generally the coding of a key is based on a software centred on a reference line or on a central line passing for the key itself; anyway in the present technique blank keys, even if nominally identical, because of the natural production tolerance, can have different largeness even of few tenths of millimeters; therefore it would be necessary to position each single key laterally, that is with respect to axis "X", so that its physical reference line corresponds to the reference line "known" by the coding software.

To avoid this inconvenience which would force an onerous and uncertain mounting operation for each blank key, the present implementation instructs how to make the clamping device according to the invention in a totally symmetrical way with respect to said plane "S", at least as far as the elements and devices whereon the lateral positioning of the key are concerned.

In this way the clamping device itself becomes "self-centering", and each key there mounted is positioned automatically, in the clamping device closing, in the predetermined position in order that its physical reference line is positioned exactly in the positioning line stored in the coding software, completely independent, within certain limits, from the largeness and relative tolerances of the single keys.

In this way, having fixed the clamping device on the machine, it will be sufficient to inserted in it, without any particular precautions or warnings, the type of key relative to that clamping device, to close the clamping device itself turning the knob 15 and start the decoding or the coding procedure; it will not therefore be necessary to carry out any operation of positioning or of adjusting the key, thanks to the self-centring characteristics of the clamping device, provided by its fundamental symmetry.

The invention claimed is:

1. Clamping device for a machine duplicating keys, comprising:
    a body including two jaws which are lodged in the body, said two jaws are configured to clasp between each other in the transverse sense according to a first axis (X) and firmly clasp a key to be coded,
    wherein
    said two jaws are configured to be moved away from each other or toward each other by activation of only one operation means,
    a top portion of the body, arranged between said two jaws, can support said key and is fixed to said body,
    a bridge is configured to press said key against said top portion of said body through a translation motion in a direction parallel to a second axis (Y) orthogonal to said first axis (X),
    said bridge is configured to at least partially engage said two jaws and is operated by the movement of the two jaws toward said key.

2. The clamping device according to claim 1, wherein
    said two jaws are provided with respective inclined portions each of which has a predetermined inclination with respect to a central reference plane (S) passing through said second axis (Y) and orthogonal to said first axis (X),
    and said bridge is provided with two inclined portions, each
    having the same inclination,
    being oriented towards said jaws,
    and configured to touch and slidingly engage a respective one of said inclined portions of said two jaws.

3. The clamping device according to claim 2, further comprising elastic means configured to push said bridge against said two jaws along a direction parallel to said second axis (Y).

4. The clamping device according to claim 3, wherein said elastic means comprise rigidly bound elements bound to the ends of said bridge and on the opposite sides of said key, and said clamping device further comprising spring elements respectively interposed and acting between said rigidly bound elements and respective portions or lodgings inside said body.

5. The clamping device according to claim 3, wherein said bridge includes a relief on its outer face, oriented toward said two jaws, configured to press said key against said top portion of said body.

6. The clamping device according to claim 3, wherein said operation means comprises a rotating shaft, substantially aligned along said first axis (X) and configured to engage, through an engagement screw/thread, to both respective said jaws.

7. The clamping device according to claim 3, further comprising a front stopper configured to longitudinally (Z) arrest said key in the working position between said jaws and said bridge.

8. The clamping device according to claim 2, wherein said bridge includes a relief on its outer face, oriented toward said two jaws, and configured to press said key against said top portion of said body.

9. The clamping device according to claim 8, wherein said two jaws are configured to move toward each other, through the activation of said operation means, until clamping against said key after said relief has been tightened against said key.

10. The clamping device according to claim 9, wherein said operation means comprises a rotating shaft, substantially aligned along said first axis (X) and configured to engage, through an engagement screw/thread, to both respective said jaws.

11. The clamping device according to claim 9, further comprising a front stopper configured to longitudinally (Z) arrest said key in the working position between said jaws and said bridge.

12. The clamping device according to claim 8, wherein said operation means comprises a rotating shaft, substantially aligned along said first axis (X) and configured to engage, through an engagement screw/thread, to both respective said jaws.

13. The clamping device according to claim 8, further comprising a front stopper configured to longitudinally (Z) arrest said key in the working position between said jaws and said bridge.

14. The clamping device according to claim 8, wherein said elastic means comprise rigidly bound elements bound to the ends of said bridge and on the opposite sides of said key, and said clamping device further comprising spring elements respectively interposed and acting between said rigidly bound elements and respective portions or lodgings inside said body.

15. The clamping device according to claim 2, wherein said operation means comprises a rotating shaft, substantially aligned along said first axis (X) and configured to engage, through an engagement screw/thread, to both respective said jaws.

16. The clamping device according to claim 2, further comprising a front stopper configured to longitudinally (Z) arrest said key in the working position between said jaws and said bridge.

17. The clamping device according to claim 1, wherein said operation means comprises a rotating shaft, substantially aligned along said first axis (X) and which can be engaged, through an engagement screw/thread, to both respective said jaws.

18. The clamping device according to claim 17, further comprising a front stopper configured to longitudinally (Z) arrest said key in the working position between said jaws and said bridge.

19. The clamping device according to claim 1, further comprising a front stopper configured to longitudinally (Z) arrest said key in the working position between said jaws and said bridge.

20. The clamping device according to claim 1, wherein said clamping device is substantially symmetrical with respect to a pre-determined symmetry plane (S) orthogonal to said first axis (X).

* * * * *